United States Patent
Lin et al.

(10) Patent No.: US 10,571,126 B2
(45) Date of Patent: Feb. 25, 2020

(54) METHOD TO PROVIDE A BRAZE COATING WITH WEAR PROPERTY ON MICROMIXER TUBES

(71) Applicant: GENERAL ELECTRIC COMPANY, Schenectady, NY (US)

(72) Inventors: Dechao Lin, Greer, SC (US); Srikanth Chandrudu Kottilingam, Simpsonville, SC (US); Brian Lee Tollison, Honea Path, SC (US); Yan Cui, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 207 days.

(21) Appl. No.: 15/427,831

(22) Filed: Feb. 8, 2017

(65) Prior Publication Data
US 2018/0224124 A1 Aug. 9, 2018

(51) Int. Cl.
*F23R 3/32* (2006.01)
*F23R 3/28* (2006.01)
(Continued)

(52) U.S. Cl.
CPC .......... *F23R 3/286* (2013.01); *B01F 13/0062* (2013.01); *B23K 1/0018* (2013.01); *B23K 1/19* (2013.01); *F23D 14/64* (2013.01); *F23R 3/045* (2013.01); *F23R 3/283* (2013.01); *B01F 2215/0086* (2013.01); *B23K 2101/001* (2018.08); *B23K 2103/05* (2018.08); *F23R 2900/00005* (2013.01)

(58) Field of Classification Search
CPC ......... B01F 13/0062; B01F 2215/0086; B23K 1/0018; B23K 1/19; B23K 2101/001; B23K 2103/05; F23R 3/286; F23R 3/045; F23R 3/283; F23R 2900/00005; F23D 14/64
USPC .......................................................... 261/76
See application file for complete search history.

(56) References Cited

U.S. PATENT DOCUMENTS

| | | | |
|---|---|---|---|
| 2006/0275106 A1* | 12/2006 | Alvanos | F01D 5/082 415/110 |
| 2013/0241089 A1 | 2/2013 | Westmoreland et al. | |

(Continued)

FOREIGN PATENT DOCUMENTS

| | | |
|---|---|---|
| EP | 1065297 A2 | 1/2001 |
| GB | 2445576 A | 7/2008 |

OTHER PUBLICATIONS

Extended European Search Report and Opinion issued in connection with corresponding EP Application No. 18155310, dated Jul. 9, 2018.

*Primary Examiner* — Charles S Bushey
(74) *Attorney, Agent, or Firm* — McNees Wallace & Nurick LLC

(57) ABSTRACT

Manufactured articles, and methods of manufacturing enhanced wear protected components and articles. More particularly, wear protected components and articles, such as combustor components of turbine engines, and even more particularly enhanced wear protected micromixer tubes and assemblies thereof with one or more micromixer plates, the micromixer tubes having wear protection for enhanced performance and reduced wear related failure. Methods including surface treatment to enhance wear, including vacuum braze application of coatings to enhance surface hardness for wear benefits.

20 Claims, 3 Drawing Sheets

(51) Int. Cl.
*B01F 13/00* (2006.01)
*B23K 1/00* (2006.01)
*B23K 1/19* (2006.01)
*F23D 14/64* (2006.01)
*F23R 3/04* (2006.01)
*B23K 101/00* (2006.01)
*B23K 103/04* (2006.01)

(56) References Cited

U.S. PATENT DOCUMENTS

| | | | |
|---|---|---|---|
| 2013/0199193 A1 | 8/2013 | Giannozzi et al. | |
| 2014/0212208 A1 | 7/2014 | Schick et al. | |
| 2014/0260271 A1* | 9/2014 | Keener | F23R 3/10 60/737 |
| 2014/0338344 A1* | 11/2014 | Stewart | F23R 3/10 60/747 |
| 2014/0338354 A1* | 11/2014 | Stewart | F23R 3/286 60/776 |
| 2014/0338355 A1* | 11/2014 | Stewart | F23R 3/283 60/776 |
| 2014/0338356 A1* | 11/2014 | Keener | F23R 3/286 60/776 |
| 2015/0165568 A1 | 6/2015 | Means et al. | |
| 2015/0167983 A1* | 6/2015 | McConnaughhay | F23R 3/283 60/726 |

* cited by examiner

METHOD TO PROVIDE A BRAZE COATING WITH WEAR PROPERTY ON MICROMIXER TUBES

FIELD OF THE INVENTION

The present invention is directed to manufactured articles, and methods of manufacturing micromixer components and articles. More particularly, embodiments of the present invention relate to wear protected components and articles, such as combustor components of turbine engines, and even more particularly to enhanced wear protected micromixer tubes and assemblies thereof with one or more micromixer plates, the micromixer tubes having wear protection for enhanced performance and reduced wear related failure.

BACKGROUND OF THE INVENTION

Turbine engines typically include one or more components that compress an incoming flow of air and deliver the compressed flow of air to a combustor that mixes the compressed flow of air with a pressurized flow of fuel and ignites the mixture to create a flow of combustion gases. Combustors of turbine systems often include a micromixer assembly that typically includes a base nozzle structure in communication with a fuel plenum, an air intake, and numerous mixing tubes forming one or more segmented mixing tube bundles. The base nozzle structure supplies a fuel to the fuel plenum. The fuel exits the fuel plenum and enters the mixing tubes. Air is directed into the mixing tubes through the air intake and mixes with the fuel to create an air/fuel mixture. The air/fuel mixture exits the mixing tubes and enters into a downstream combustion chamber. This flow of combustion gases drives the turbine to produce mechanical work for electrical power generation and the like. A turbine engine may use any of a variety of fuels and may be selected from any of a number of different turbine engines, such as those offered by General Electric Company of Schenectady, N.Y. In some particular embodiments, the micromixer assembly includes a plurality of tubes and at least a first end plate that has a plurality of holes drilled or otherwise cut into it in which a first end of each of the tubes terminates, the plurality of holes in the end plate corresponding in number to the plurality of tubes that are disposed within the apertures thereof.

According to various methods, assembly of micromixer tubes within the plate apertures involves a process for fixing them therein in order to stabilize the assembly and minimize vibration of the tubes within the plate. In some instances, this fixation is achieved by friction welding, and in other instances, by use of a relatively expensive brazing filler, which may include gold and/or nickel. Such processes can be time consuming and expensive, and may not always achieve the desired result. Thus, during operation, vibration of the tube within the plate aperture can lead to wear that can ultimately contribute to metal loss and tube tip failure, which can in turn lead to combustor inefficiency and possible failure.

BRIEF DESCRIPTION OF THE INVENTION

According to an aspect of the invention, a micromixer assembly of a turbine system includes a plate having at least one aperture comprising a receiving diameter, and at least one micromixer tube having an inlet and an outlet for receiving a flow and dispersing the flow to a combustor, wherein the at least one micromixer tube includes an outer surface having an outer diameter configured to fit within the receiving diameter of the at least one plate aperture, wherein the at least one tube is adapted with a surface treatment for reducing wear, the surface treatment comprising at least a brazed wear coating.

According to another aspect of the invention, a method of assembling a wear resistant micromixer assembly of a turbine system is provided. The method includes applying a surface treatment to at least a portion of at least one micromixer tube, the treatment comprising application of a braze alloy followed by processing to form a wear resistant brazed coating. The method optionally further includes applying at least one bonding coat layer directly adjacent the micromixer tube, over which layer the brazed wear layer is applied. The method optionally further includes applying at least one heat resistant coat, such as a thermal barrier coating, either or both between the material of the micromixer tube and the brazed wear layer or over the brazed wear layer. Also included is inserting the surface treated micromixer tube into a receiving aperture of a plate. Optionally, further included is applying a fixation means for securing engagement between the micromixer tube and the plate, the means optionally including exerting a radial force on an inner wall of the tube with an expander to form at least one operable connection between an outer diameter of the tube and the receiving aperture of the plate.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Provided are manufacturing methods, and articles for combustion micromixer tube wear management including micromixer tubes and assemblies. Embodiments of the present disclosure, in comparison to articles and methods that do not include one or more of the features disclosed herein, provide additional wear protection features to extend the operating lifetime of the parts, minimize the need for use of costlier materials and processes for assembly and fixation of combustor parts, permit the useful life of turbine components to be extended, permit gas turbine systems using embodiments of the turbine components to be more efficient, permit use of less costly underlying parts materials, or a combination thereof. In particular, embodiments of the present disclosure, in comparison to processes and articles that do not include one or more of the features disclosed herein, enable a significant wear reduction benefit, thereby allowing metal loss and tube tip failure, and thereby enhancing part life and continued operation of the turbine.

Figure 1:
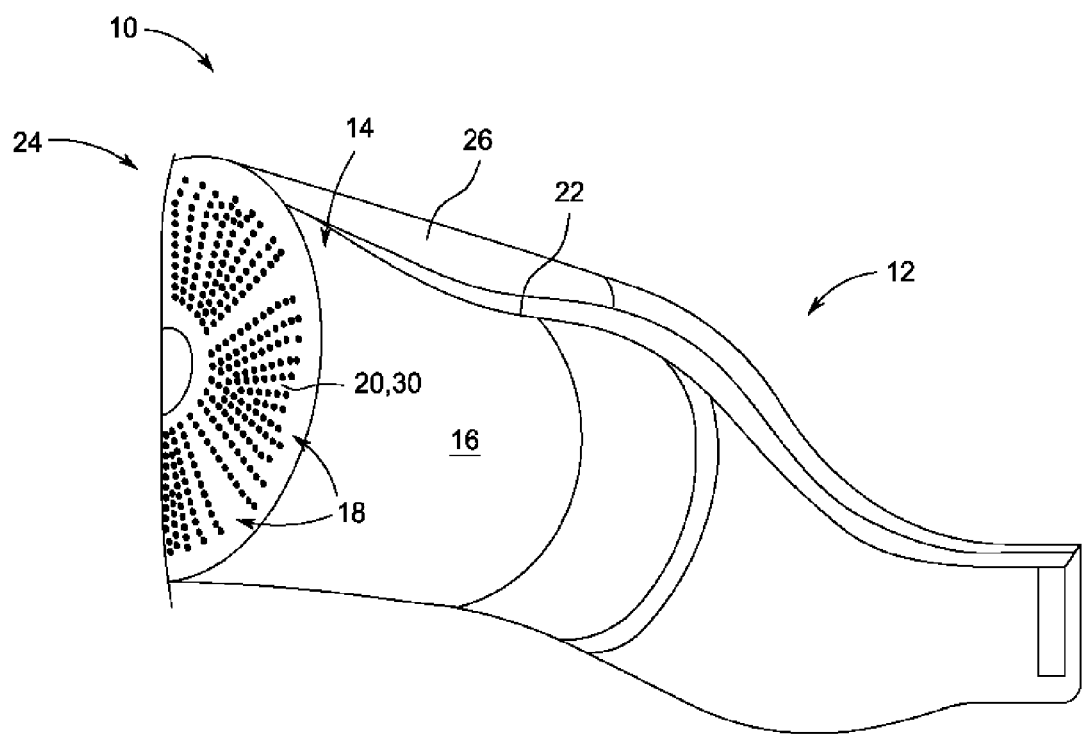
FIG. 1 is a perspective view of a turbine system having a micromixer assembly located in a head end.

Referring now to FIG. 1, illustrated is a representative embodiment of a combustion component of a turbine system 10 having a combustor section 12 and a head end 14. The head end 14 is disposed at an adjacent upstream location of the combustor section 12 and includes a micromixer assembly 16. The micromixer assembly 16 includes a plate 17 that extends generally radially and circumferentially and has, in some embodiments, a plurality of sectors 18, each of which comprises a plurality of tubes 20. The combustor section 12 is defined by an outer liner 22 that extends to an upstream end 24. Spaced radially outwardly of the outer liner 22, and surrounding and enclosing the outer liner 22, is a flow sleeve 26. A flow of air passes upstream within an air passage defined by the outer liner 22 and the flow sleeve 26 to the upstream end 24 of the outer liner 22. It will be appreciated that the embodiment shown is merely representative, and that other examples of combustion components are known in the art, including those with alternate features of micromixer assemblies, thus, the embodiments as shown is not limiting.

In operation of the combustor, a working fluid can flow through the passage of the flow sleeve 26 along the outside of the outer liner 22 to provide convective cooling to the outer liner 22. When the fluid reaches the end cover of the combustor, the fluid reverses direction and flows through at least a portion of the tubes 20 where it mixes with fuel before it is injected into the combustor section 12. The tubes 20 generally include an upstream end that is axially separated from a downstream end, and according to the invention, as described herein below, each of the tubes 20 is brazed at least at an end that inserts into one or more plates 17.

Figure 2:
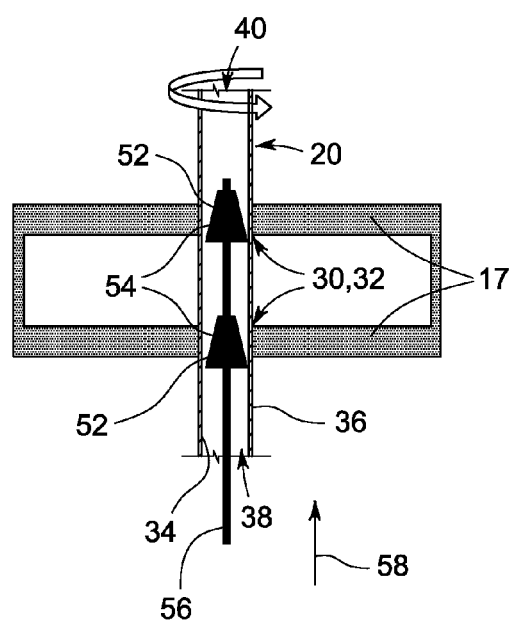
FIG. 2 is a top, cross-sectional view of a micromixer tube disposed within an aperture of a plate and an expander disposed within the micromixer tube; and, FIG. 3 is a flow diagram illustrating a method of preparing a surface treated micromixer tube and assembling the enhanced wear resistant micromixer assembly.

Referring to FIG. 2, a top, cross-sectional view of the plate 17 and a tube 20 of the plurality of tubes is illustrated, showing the tube 20 disposed within a receiving aperture 30 of the plate 17. The plate 17 includes a plurality of receiving apertures that extend relatively axially through the plate 17 and are each configured to have a receiving diameter 32 that is dimensioned to allow the tube 20 to be inserted therein. Specifically, the tube 20 comprises an inner diameter 34, an outer diameter 36, an inlet 38 and an outlet 40. It is the outer diameter 36 of the tube 20 that is dimensioned to be inserted within the receiving diameter 32 of the receiving aperture 30.

In some embodiments, the tube 20 is dimensioned and adapted to facilitate the formation of a friction weld between an outer wall portion of the tube 20 and the receiving aperture 30 of the plate. According to some such embodiments, as is shown in FIG. 2, a micromixer tube 20 may be adapted to receive an expander 50 that includes at least one expander head 52 having an outer diameter 54 that is closely dimensioned with that of the inner diameter 34 of the tube 20. The expander 50 comprises a shaft portion 56 that extends in a longitudinal direction 58 that relatively coincides with an axial direction of the turbine system 10, with the at least one expander head 52 disposed along the length thereof. The function of the expander head 52 is to be controllably disposed at a position within the tube 20 that is desired to form a friction weld with the receiving aperture 30 of the plate 17. It will be appreciated that there are alternate means by which a tube may be affixed into engagement within a plate aperture, and the expander means for friction welding is but one example and is thus, non-limiting with respect to the disclosure.

Each of the plurality of tubes and the plate are typically formed of a durable material that is suitable for functioning in a region having a temperature that may exceed 1,600° F. (871° C.). Such a material may comprise stainless steel and/or a nickel-based alloy, such as Hastelloy® X, the aforementioned material being discussed herein as merely illustrative and non-limiting. In various non-limiting examples, the tubes and plates may include any suitable material, for example, stainless steel, a nickel-based alloy, an iron-based alloy, or any other suitable metal or metallic material.

Figure 3:
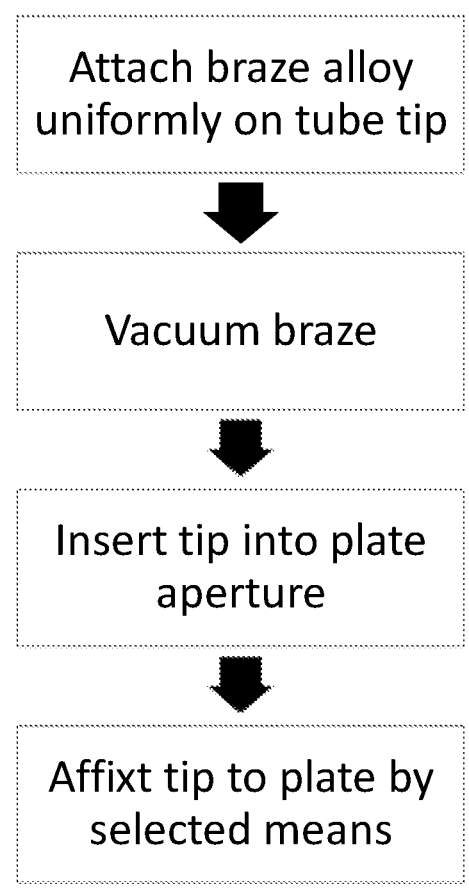

In accordance with the disclosure, methods are provided for improving the wear resistance of micromixer tubes, in particular the tube ends that are engaged with one or more micromixer plates. Referring now to FIG. 3, a representative flow diagram of the methods according to the disclosure is provided. Brazing may be accomplished by any suitable brazing technique. And it will be appreciated that the term brazing as used herein is with reference to surface treatment of a micromixer tube as substrate wherein the process does not include joining workpieces, but rather is performed to affix a braze filler material directly to the surface of the micromixer tube to achieve benefits. In some embodiments according to the invention, the techniques of vacuum brazing are used. As used herein, vacuum brazing means and refers to a process that offers the advantages of providing clean, superior, flux-free braze joints and surfaces of high integrity and strength. The process is performed inside a vacuum chamber vessel at a pressure of about $8 \times 10^{-4}$ torr, and in some embodiments, not more than $8 \times 10^{-4}$ torr, wherein temperature uniformity typically in the range from about 1500° F. to about 2300° F. is maintained on the work piece under continuous heat to thereby reduce or eliminate the stress that can be introduced by other methods where heating and cooling cycles can occur.

Thus, in one embodiment, the brazing is accomplished as a single-step vacuum brazing, at about $8 \times 10^{-4}$ torr and the brazing temperature is between about 1500° F. and about 2300° F., between about 1500° F. and about 2300° F., between about 1500° F. and about 1800° F., between about 2000° F. and about 2300° F., between about 1800° F. and about 2300° F., between about 1800° F. and about 2100° F., or any suitable combination, sub-combination, range, or sub-range therein. In one embodiment, the brazing duration is between about 1 minute and about 30 minutes, between about 5 minutes and about 30 minutes, between about 15 minutes and about 30 minutes, between about 20 minutes and about 30 minutes, about 10 minutes, about 15 minutes, about 20 minutes, about 30 minutes, or any suitable combination, sub-combination, range, or sub-range therein.

According to one embodiment, the methods include applying a surface treatment to at least a portion of at least one micromixer tube, the treatment comprising a wear resistant brazed coating by application of one or a mix of powdered braze materials to all or a portion of a micromixer tube followed by vacuum brazing. In accordance with such methods, the powdered braze material comprises known or novel low melt materials, and in particular, for use with tubes formed of stainless steel, the braze powders are particularly compatible with such tube base material. It will be appreciated, of course, that other tube base materials may be used, and as such, other braze materials may be selected, which may be low melt or other than low melt, and the method of brazing may be other than vacuum brazing.

Thus, in accordance with various embodiments, the material for the braze powders selected for the braze coat surface treatment may be any suitable brazing material, including, but not limited to, metal alloys and superalloys, including nickel and cobalt-based superalloys, alloys and combinations thereof. Suitable examples of a nickel-based alloy may have a formula (by mass) of $Ni_{0.6715}Cr_{0.14}B_{0.0275}Co_{0.1}Al_{0.035}Ta_{0.025}Y_{0.001}$ (commercially available as Amdry DF4B from Sulzer Metco, located in Westbury, N.Y.) or a formula (by mass) of $Ni_{0.71}Cr_{0.019}Si_{0.10}$ (commercially available as BNi-5 from many providers, including Wall Colmonoy, located in Madison Heights, Mich.). The braze layer may enable a fit tolerance between THE surface of the micromixer tube and the inner surface of the plate aperture of between about 0.0005 inches to about 0.008 inches. The braze surface treatment may fill minor gaps and surface imperfections on the tubes, and in various embodiments, the braze coat provides enhanced surface hardness imparting greater wear resistance as compared to conventional micromixer tubes that are not braze treated.

In one example according to the disclosure, a selection of micromixer tubes were surface treated with a braze material to confer wear resistance. In such representative embodiment, a low-melt material (MM509B) suitable for brazing the micromixer tube components may be selected, having a composition, by weight, of between about 22.5% and about 24.25% Cr, up to about 0.3% Ti (for example, between about 0.15% and about 0.3%), between about 6.5% and about 7.5% W, between about 9% and about 11% Ni, between about 3% and about 4% Ta, up to about 0.65% C (for example, between about 0.55% and about 0.65%), between about 2% and about 3% B (for example, between about 2% and about 3%), about 1.3% Fe, up to about 0.4% Si, up to about 0.1% Mn, up to about 0.02% S, and a balance of cobalt. Another suitable low-melt material has a composition, by weight, of about 14% Cr, about 9% Co, about 4% Al, about 2.5% B, and a balance of nickel. Another suitable low-melt material has a composition, by weight, of about 15.3% Cr, about 10.3% Co, about 3.5% Ta, about 3.5% Al, about 2.3% B, and a balance of nickel. In yet other examples, alloys suitable for brazing according to the instant disclosure include materials selected from BN12, and BN19.

According to such embodiments, surface treated micromixer tubes are provided with a braze surface treatment in the range from about 2 mm to 3 mm coat thickness, using the low-melt braze coating material as described above. The braze treatment confers visibly altered surface properties and provides enhanced surface hardness. In accordance with the disclosure, surface treatment of the micromixer tubes may range from about 1 mm to about 5 mm thickness, and in various embodiments, the thickness may be 1 mm, 2 mm, 3 mm, 4 mm, and 5 mm, and fractions there between in the amount of from 0.1 MM to 0.5 mm.

It will be appreciated that the braze materials may be used alone, or in combinations. Accordingly, in some embodiments, the braze powders used herein may include a combination of MM509B with BN12, or the combination of MM509B with BN19.

The method optionally further includes applying at least one bonding coat layer directly adjacent the micromixer tube, over which layer the brazed wear layer is applied. The method optionally further includes applying at least one heat resistant coat, such as a thermal barrier coating, either or both between the material of the micromixer tube and the brazed wear layer or over the brazed wear layer. Also included is inserting the tube into a receiving aperture of a plate. Optionally, further included is applying a fixation means for securing engagement between the tube and the plate, the means optionally including exerting a radial force on an inner wall of the tube with an expander to form at least one operable connection between an outer diameter of the tube and the receiving aperture of the plate.

A technical advantage of the present surface treatment for micromixer tubes includes greater longevity for the mixing tubes, and reduced failure rate of the tubes and the combustor. Another advantage is reduction of cost associated with repairs.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A micromixer assembly of a turbine system comprising:
    a plate having at least one aperture having a receiving diameter;
    at least one micromixer tube having an inlet and an outlet for receiving a flow and dispersing the flow to a combustor, and having an outer surface having a diameter configured to fit within the receiving diameter of the at least one plate aperture, the at least one micromixer tube comprising on at least a portion of its outer surface a surface treatment layer comprising a wear-resistant treatment layer; the at least one micromixer tube being inserted through the plate aperture and optionally operably coupled at a location on its outer surface to the plate at the at least one aperture,
    wherein the wear-resistant treatment layer consists of a brazed braze alloy powder.

2. The micromixer assembly of claim 1, further comprising a plurality of plate apertures and a plurality of micromixer tubes inserted through respective ones of the plurality of apertures.

3. The micromixer assembly of claim 2, wherein one or more of the at least one micromixer tube is operably coupled to the plate.

4. The micromixer assembly of claim 3, wherein the coupling between the one or more of the at least one micromixer tube and the plate includes at least one braze joint.

5. The micromixer assembly of claim 4, wherein the at least one braze joint includes at least one vacuum braze joint.

6. The micromixer assembly of claim 3, wherein the coupling between the one or more of the at least one micromixer tube and the plate includes at least one friction weld joint.

7. The micromixer assembly of claim 1, wherein the surface treatment layer comprises a bond coat layer disposed between the at least the portion of the outer surface of the at least one micromixer tube and the wear-resistant treatment layer.

8. The micromixer assembly of claim 1, wherein the at least one micromixer tube is secured to the plate.

9. The micromixer assembly of claim 1, wherein the at least one micromixer tube comprises a material selected from stainless steel and a nickel-based alloy.

10. The micromixer assembly of claim 1, wherein the surface treatment layer further includes a thermal barrier coating disposed between the at least the portion of the outer surface of the at least one micromixer tube and the wear-resistant treatment layer, disposed over the wear-resistant treatment layer, or disposed both between the at least the portion of the outer surface of the at least one micromixer tube and over the wear-resistant treatment layer.

11. The micromixer assembly of claim 1, wherein the brazed braze alloy powder is selected from the group consisting of, by weight percent:
- 14% chromium, 2.75% boron, 10% cobalt, 3.5% aluminum, 2.5% tantalum, 0.1% yttrium, and 67.15% nickel;
- 19% chromium, 10% silicon, 71% nickel;
- between about 22.5% and about 24.25% chromium, up to about 0.3% titanium, between about 6.5% and about 7.5% tungsten, between about 9% and about 11% nickel, between about 3% and about 4% tantalum, up to about 0.65% carbon, between about 2% and about 3% boron, about 1.3% iron, up to about 0.4% silicon, up to about 0.1% manganese, up to about 0.02% sulfur, and a balance of cobalt;
- about 14% chromium, about 9% cobalt, about 4% aluminum, about 2.5% boron, and a balance of nickel;
- about 15.3% chromium, about 10.3% cobalt, about 3.5% tantalum, about 3.5% aluminum, about 2.3% boron, and a balance of nickel; and
- combinations thereof.

12. The micromixer assembly of claim 1, wherein the surface treatment layer consists of:
- the wear-resistant treatment layer;
- optionally, a bond coat layer disposed between the at least the portion of the outer surface of the at least one micromixer tube and the wear-resistant treatment layer; and
- optionally, a thermal barrier coating disposed between the at least the portion of the outer surface of the at least one micromixer tube and the wear-resistant treatment layer, disposed over the wear-resistant treatment layer, or disposed both between the at least the portion of the outer surface of the at least one micromixer tube and over the wear-resistant treatment layer.

13. A method of assembling a micromixer assembly of a turbine system comprising:
- applying a surface treatment layer to at least a portion of an outer surface of at least one micromixer tube having an inlet and an outlet for receiving a flow and dispersing the flow to a combustor, applying the surface treatment layer comprising application of a braze alloy powder followed by vacuum braze processing to form a wear-resistant treatment layer, the wear-resistant treatment layer consisting of a brazed braze alloy powder;
- inserting the at least one micromixer tube having the surface treatment layer into a receiving aperture of a plate; and
- optionally securing the micromixer tube and the plate.

14. The method of assembling a micromixer assembly of a turbine system according to claim 13, wherein the at least one micromixer tube comprises a material selected from stainless steel and a nickel-based alloy.

15. The method of assembling a micromixer assembly of a turbine system according to claim 14, wherein the steps are repeated for a plurality of micromixer tubes.

16. The method of assembling a micromixer assembly of a turbine system according to claim 13, wherein the at least one micromixer tube is operably coupled to the plate.

17. The method of assembling a micromixer assembly of a turbine system according to claim 16, wherein the mode of coupling between the at least one micromixer tube and the plate is vacuum brazing.

18. The method of assembling a micromixer assembly of a turbine system according to claim 16, wherein the mode of coupling between the at least one micromixer tube and the plate is friction welding.

19. The method of assembling a micromixer assembly of a turbine system according to claim 18, wherein friction welding is achieved by exerting a radial force on an inner wall of the tube with an expander to form at least one operable connection between the outer surface of the at least one micromixer tube and the receiving aperture of the plate.

20. The method of assembling a micromixer assembly of a turbine system according to claim 13, wherein applying the surface treatment layer further includes applying one or both of a bond coat layer and a thermal barrier coating.

* * * * *